United States Patent [19]
Baba et al.

[11] Patent Number: 5,485,500
[45] Date of Patent: Jan. 16, 1996

[54] DIGITAL X-RAY IMAGING SYSTEM AND METHOD

[75] Inventors: Rika Baba, Kokubunji; Ken Ueda, Ome; Hisatake Yokouchi, Tokyo; Yoichi Onodera, Asaka; Keiji Umetani, Hino; Masayuki Tsuneoka, Kashiwa, all of Japan

[73] Assignee: Hitachi Medical Corporation, Tokyo, Japan

[21] Appl. No.: 186,471

[22] Filed: Jan. 26, 1994

[30] Foreign Application Priority Data

Jan. 29, 1993 [JP] Japan .................................. 5-013310
Jun. 14, 1993 [JP] Japan .................................. 5-141885

[51] Int. Cl.$^6$ ...................................................... G21K 5/10
[52] U.S. Cl. .................... 378/98.2; 378/98.12; 378/98.8; 378/146
[58] Field of Search ........................... 378/98.2, 98, 98.3, 378/98.5, 98.6, 98.8, 98.12, 62, 176, 163, 164, 98.4, 190, 21–25, 146, 154, 155

[56] References Cited

U.S. PATENT DOCUMENTS

| | | | |
|---|---|---|---|
| 4,613,983 | 9/1986 | Yedid et al. | 378/98.12 |
| 4,829,552 | 5/1989 | Rossi et al. | 378/98.4 |
| 5,349,625 | 9/1994 | Born et al. | 378/146 |

FOREIGN PATENT DOCUMENTS 264372 10/1990 Japan .

OTHER PUBLICATIONS

Electromedica vol. 60 (1992) No. 1 pp. 2–5.
Radiology vol. 171, No. (May 1989), pp. 297–307.

*Primary Examiner*—Constantine Hannaher
*Assistant Examiner*—Don Wong
*Attorney, Agent, or Firm*—Antonelli, Terry, Stout & Kraus

[57] ABSTRACT

A digital X-ray imaging system having an X-ray generator, an X-ray generator controller for controlling the X-ray generator, an X-ray detecting unit for detecting an X-ray transmitted through a subject, the X-ray detecting unit having an X-ray grid for shielding a scattered X-ray, a signal processor for acquiring a signal from the X-ray detecting unit and processing the signal to obtain a digital X-ray image of the subject, and a display device for displaying an image of the subject obtained by the signal processor. The system is provided with a position changing unit for changing a relative position between the X-ray detecting unit and the subject, a position change controller for controlling the position changing unit, and an imaging-sequence controller for controlling the position change controller and the X-ray generator controller. The imaging controller controls setting of each of a plurality of target imaging regions of the subject to generally a central area of an X-ray detecting plane of the X-ray detector, the X-ray detecting plane being an incident plane of the transmitted X-ray, and to set at least one imaging view field to contain an intermediate region between target imaging regions. The whole or part of a plurality of obtained digital X-ray images is used to join a single or a plurality of digital X-ray images for display.

47 Claims, 9 Drawing Sheets

F I G. 2
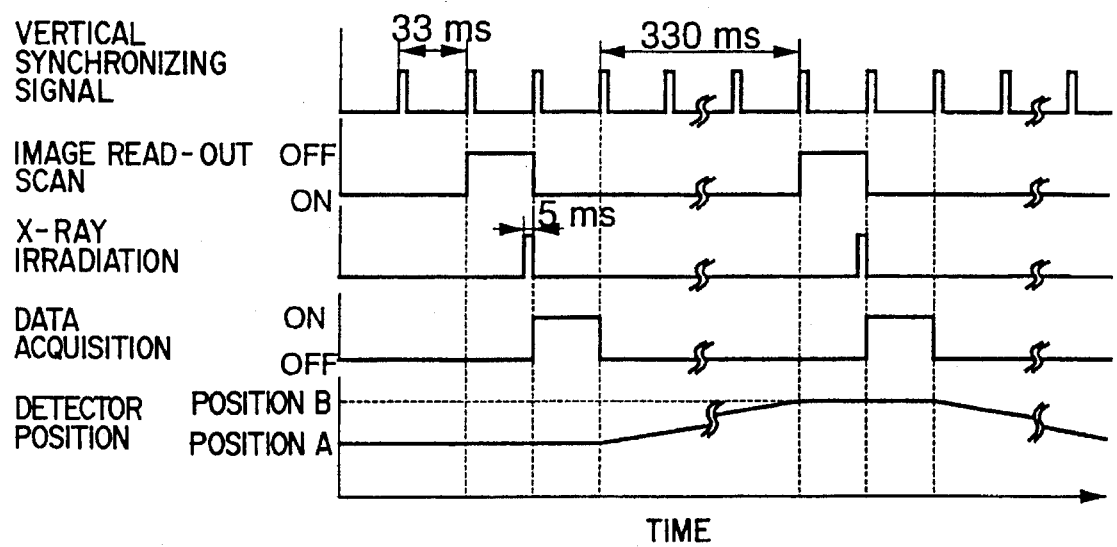

IMAGE VALUE

CORRECTION FACTOR

CORRECTION FACTOR

CORRECTION FACTOR

DIGITAL X-RAY IMAGING SYSTEM AND METHOD

BACKGROUND OF THE INVENTION

The present invention relates to a digital X-ray imaging system and method, and more particularly to a digital X-ray imaging system and method suitable for imaging a large field of view such as a chest.

Conventional methods of taking an image of a subject by transmitting therethrough an X-ray are grouped into a method using an X-ray film and a digital radiography (hereinafter abbreviated as "DR") method of taking a digital X-ray image. The DR method is expected to improve a diagnosis performance by using image processing, and can electronically record, store, and search X-ray images. There are known various chest DR methods, including a film digitizing method in which an image taken on an X-ray film is digitized, a storage phosphor digital method in which storage phosphor is used in place of an X-ray film and a latent image is scanned by a laser beam to read it and form a visualized image, a scanography method in which a combination of a one-dimensional X-ray beam and a one-dimensional detector array is used, and an X-ray image intensifier-television camera-method (herein after abbreviated as "X-ray II-TV method) in which uses a combination of an X-ray image intensifier (hereinafter abbreviated as "X-ray II") for converting an X-ray image into an optical image and amplifying it and a television camera for converting the amplified optical image into electric signals.

Of these DR methods, the X-ray II-TV method is also called a real time DR method, has the function of immediately displaying and storing a taken image, and has the shortest time required for taking and processing one image. Therefore, a success or failure of imaging can be judged at once, and this method is suitable for mass screening because of a short time required for one test. It is also suitable for urgent check, and routine as well as accurate diagnosis at hospitals because it takes a short time to obtain the results of imaging and it is possible to provide the functions of sequential imaging, dynamic imaging, fluoroscopy, and the like as well as quick diagnosis. The methods other than the X-ray II-TV method require 30 seconds or longer for imaging and reading image data.

A technique disclosed, for example, in Electromedica Vol. 60(1992), No. 1, pp. 2–5 is known in which the X-ray II-TV method is used to obtain an X-ray image at an imaging target region wider than the field of view of the X-ray detector, by divisionally imaging the region a plurality of times while changing a relative position of the X-ray detector and the subject. According to this technique, a subject lies on a bed in a dorsal position, and the X-ray source and X-ray detector are moved in unison in one direction, for example, in parallel with the longitudinal direction of the subject. An angiogram of lower extremities, for example, is divisionally imaged a plurality of times, and a plurality of obtained images are joined together to display them as a one complete image.

Although the X-ray II-TV method has the above-described superior advantages, conventional DR methods have been accompanied with the problem that one of a field of view and a spatial resolution is inferior to the other methods. It is technically difficult to manufacture an X-ray II which can take an image of a large view field at a ultra high resolution. As an X-ray II having a filed of view as large as about 40 cm * 40 cm necessary for imaging a chest, there is known an X-ray II having a field of view of 47 cm described in Radiology Vol. 171, No. 2 (May, 1989), pp. 297–307). This X-ray II however has a spatial resolution inferior to other methods. Another problem associated with an X-ray II is that the more the position goes apart from the center of the field of view, the more the spatial resolution at the position lowers. Therefore, when lungs are imaged, the central area of the X-ray II having a high resolution images the central region of the mediastinum, whereas the peripheral area of the X-ray II having a lower resolution images the lung field.

With the technique disclosed in Electromedica Vol. 60 (1992), No. 1, pp. 2–5, images (photographs) of a target region divisionally taken a plurality of times are cut and pasted to join them together, and they are not image-processed by a computer. Therefore, image densities at areas around joining lines are discontinuous so that the image quality of a vascular system near the areas around joining lines is poor. In addition, this technique does not take into consideration imaging a plurality of regions of interest at the central area of the X-ray II having a higher resolution.

With the above described divisional imaging method, X-ray beams transmitting through a subject are not parallel beams but diverging beams. Since the X-ray source and X-ray detector are moved relative to the subject, diverging X-ray beams passing through the same position of a subject have different incident angles when imaging the subject a plurality of times. This different incident angle of an X-ray beam generates a positioning error of the subject image in its depth direction, being unable to correctly join a plurality of images.

This problem will be detailed with reference to FIG. 12. An X-ray source 3 and an X-ray detector 16 are moved in unison in parallel to a subject 17 at a dorsal position. As described previously, X-ray beams passing through the subject 17 are diverging beams. Therefore, when the X-ray source 3 is at point A, an X-ray beam 21 incident to the position at point P on the ventral side passes through the position at point Q on the dorsal side, whereas when the X-ray source 3 is at point B, an X-ray beam 22 incident to the position at point P on the ventral side passes through the position at point R on the dorsal side. Since an X-ray image is obtained as an X-ray transmitted image, if the X-ray images taken at positions A and B of the X-ray source 3 are joined by superposing two points P on the ventral side, the joined image is not correct because on the dorsal side, the points Q and R are joined.

SUMMARY OF THE INVENTION

It is an object of the present invention to provide a real time DR digital X-ray imaging system capable of solving the above problems associated with conventional techniques, and obtaining an X-ray image of a target region having a field of view wider than that of an X-ray detector by correctly joining a plurality of images divisionally taken a plurality of times while changing a relative position between the X-ray detector and an X-ray source.

The above object of the present invention can be achieved by a digital X-ray imaging system including an X-ray source, an X-ray slit for limiting the area of an emitted X-ray from the X-ray source, an X-ray grid for shielding a scattered X-ray, an X-ray detection unit for detecting an X-ray transmitted through a subject, a signal processor for acquiring a signal from the X-ray detection unit and processing the signal to obtain an image of the subject, a display unit for displaying the image of the subject obtained through signal processing by the signal processor, and means for controlling to set an imaging view field by changing a relative position between the X-ray detection unit and the subject, the imaging view field setting means setting each of a plurality of regions of interest of the subject to generally a central area of a view field or an X-ray detecting plane of the X-ray detection unit, and setting at least one imaging view field to contain an intermediate region between a plurality of target imaging regions.

According to the digital X-ray imaging system of this invention, each of a plurality of imaging target regions is imaged generally at a central area of the view field of the X-ray detection unit. It is therefore possible to obtain the image quality of each target region under the optimum condition. If the subject is a human chest, the right and left lung fields are imaged generally at a central area of the view field of the X-ray detection unit. It is therefore possible to obtain a more correct image of the lung field, improving the diagnosis performance of the lung field.

Since the intermediate region between a plurality of target imaging regions is contained in at least one imaging view field, there is no missing part of the view field, allowing to image all necessary regions. By using a high resolution X-ray II-TV system, immediate display and diagnosis are possible, improving a throughput. It is possible to obtain an image having a wider view field than that of the X-ray detection unit and covering both the lungs, by a plurality of radiographic exposures.

By joining together a plurality of images, diagnosis is possible by one display unit. By correcting the sensitivity of the X-ray detection unit and the geometric distortion and density of an image, it is possible to realize a digital X-ray imaging system capable of reducing the discontinuity at image joining regions and performing a more precise diagnosis.

While the X-ray source and a subject are fixed, the X-ray detection unit has construction in which relative position between the X-ray detection unit and the subject is changed to set the X-ray grid generally perpendicular to a center line passing through the center of an X-ray input plane of the X-ray grid and the. X-ray source during the exposures. Therefore, the incident angle of an X-ray beam at the same position on the subject will not change at each of a plurality of radiographic exposures, generating no image distortion in the subject depth direction. It is therefore possible to correctly join a plurality of X-ray images by correcting the sensitivity non-uniformity of the X-ray detection unit and the geometric distortion in the image regions commonly contained in a plurality of X-ray images.

An X-ray grid is mounted at the front of the X-ray detection unit. The X-ray grid covering the imaging view field effective transmits an X-ray and shields the scattered X-ray. As a result, even if the X-ray detection unit is moved, the scattered X-ray can be effectively shielded by the X-ray grid. By using a high resolution X-ray II-TV system, immediate image display and diagnosis become possible, improving a diagnosis throughput. By moving the position of the X-ray slit, unnecessary X-ray exposure to the subject can be avoided.

According to the present invention, a wide region such as a lung field can be imaged in real time at a high spatial resolution, providing immediate display and diagnosis. It is therefore possible to easily perform re-imaging and easily change the imaging conditions, permitting precise diagnosis. In the chest DR or the like, an X-ray can be effectively and directly transmitted and the scattered X-ray can be shielded, while shielding the X-ray outside of the imaging view field. Therefore, unnecessary X-ray exposure to the subject can be avoided.

BRIEF DESCRIPTION OF THE DRAWING

FIG. 2 is a sequence diagram of imaging a subject and moving an X-ray detection unit for the digital X-ray imaging system according to an embodiment of the present invention;

DESCRIPTION OF THE PREFERRED EMBODIMENTS

Embodiments of the present invention will be described in detail with reference to the accompanying drawings.

Figure 1:
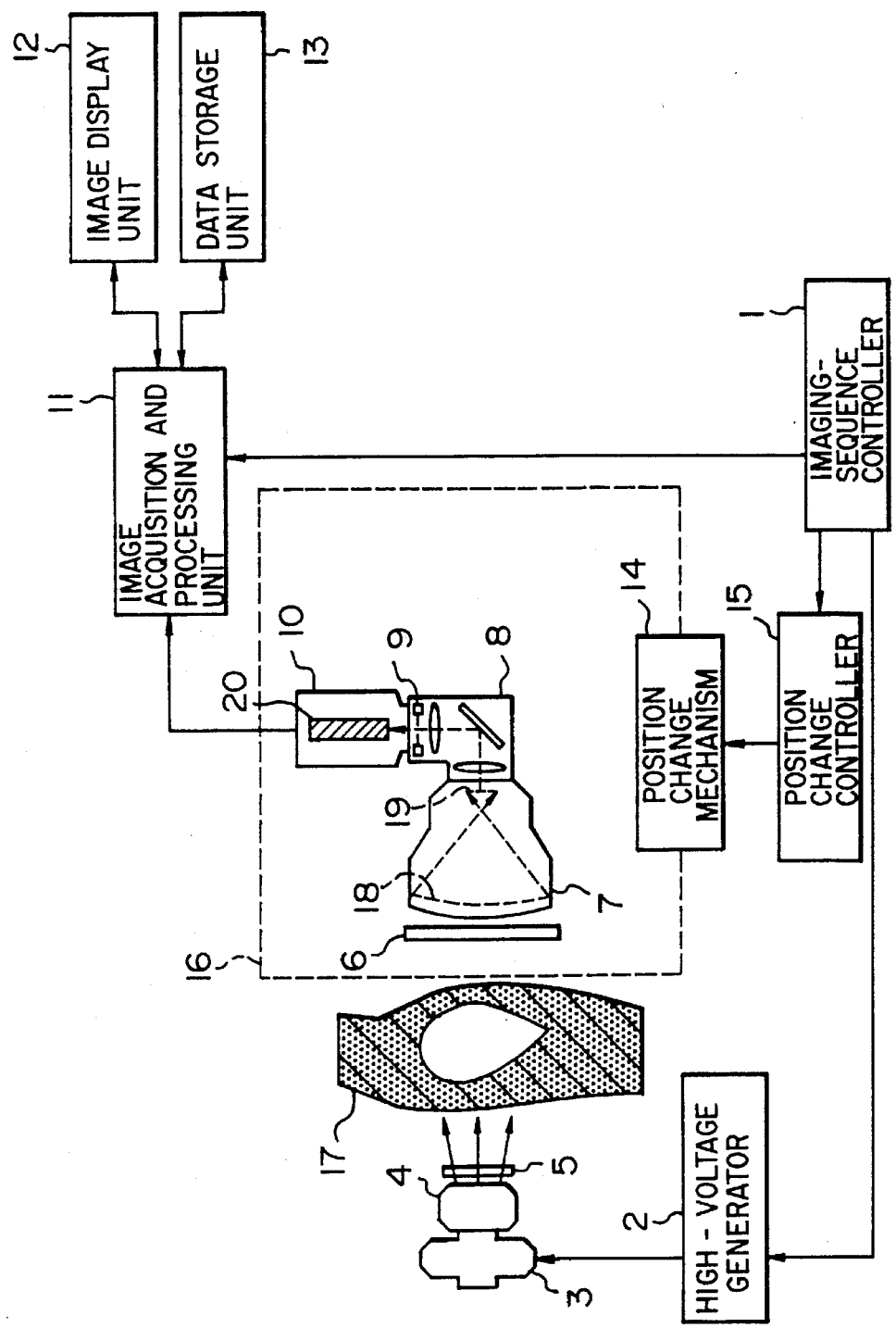
FIG. 1 is a schematic diagram showing the structure of a digital X-ray imaging system according to an embodiment of the present invention.

FIG. 1 is a schematic diagram showing the structure of a chest X-ray imaging system according to an embodiment of the present invention. The chest X-ray imaging system of this embodiment includes components, such as an imaging sequence controller 1, an X-ray tube high voltage generator 2, an X-ray tube 3, an X-ray iris and filter 4, an X-ray slit 5, an X-ray grid 6, an X-ray image intensifier 7 (hereinafter abbreviated as X-ray II), an optical lens and mirror unit 8, an iris 9, an ultra high precision television camera 10, an image acquisition and processing unit 11, an image display unit 12, a data storage unit 13, a position change mechanism 14 for controlling the position of an X-ray detection unit 16 enclosed by a broken line, and a position change controller 15.

The imaging posture of a subject is a standing position, or a dorsal or ventral position on a bed. For the standing position, an X-ray incident plane of the X-ray detection unit is positioned generally upright on the floor (like shown in FIG. 1). For the dorsal or ventral position, X-ray beams are applied to a subject from the higher or lower position and the detector is positioned under or above the bed. In the example shown in FIG. 1, the X-ray detection unit 16 moves perpendicular to the surface of the drawing sheet (parallel to the floor) for imaging a subject a plurality of times.

The television camera 10 uses as its image pickup device a high resolution image pickup tube 20. The X-ray II 7 has an effective input view field diameter of about 14 inches, corresponding to a field of view covering a single lung and mediastinum. The X-ray incident plane of the X-ray detection unit 16 is set vertical to the floor and to the center line inter-connecting the X-ray tube and the center of the X-ray incident plane.

The function of each component will be summarized in the following.

The imaging sequence controller 1 defines the imaging sequence of the X-ray detection unit 16 for X-ray imaging a single lung (right or left lung) and mediastinum at two predetermined positions, namely it defines the width and period of two X-ray pulses, the amplitude of a high voltage (X-ray tube voltage), the value of a tube current, and a position change of the X-ray detection unit 16. The position change controller 15 controls the position change mechanism 14 to maintain the X-ray detection unit 16 still at the two predetermined positions during X-ray imaging and move it during the period between the two X-ray pulses. In this manner, X-ray imaging can be performed two times consecutively at the two positions.

The X-ray slit 5 has a predetermined width through which an X-ray is transmitted, and is adapted to move in one direction and change its position with a changed imaging region.

The high voltage generator 2 generates a voltage and current and the X-ray tube 3 generates an X-ray, in accordance with an imaging sequence. An X-ray transmitted through the subject 17 is applied to the X-ray II 7 via the X-ray grid 6 at which the X-ray is attenuated by shielding its scattered X-ray. An X-ray image projected to an input phosphor screen 18 of the X-ray II 7 is converted into a visual image on an output phosphor screen 19. The optical lens and mirror unit 8 focusses the visual image onto the television camera 10 which converts the image into a video signal to be inputted to the image acquisition and processing unit 11.

At the image acquisition and processing unit 11, the video signal is A/D converted and stored in an internal frame memory. Geometric distortion and image level (density) shading of the two digital X-ray images inherent to the X-ray detection unit are corrected. Two corrected images are joined together so as to align the subject regions commonly contained in the two images, image-processed, displayed on the image display unit 12, and stored in the data storage unit 13. The data display unit 12 displays either a single lung image, a joined image, or a composite image of right and left lung juxtaposed images.

FIG. 2 illustrates an example of a position change sequence in the imaging sequence. Both the position (position A) of the X-ray detection unit 16 covering the region of one lung and mediastinum and the position (position B) covering the region of the other lung and mediastinum are determined beforehand. Typically, positions A and B are located at the right and left sides of a subject, 85 mm from the center line of it.

First, the position of the X-ray detection unit 16 is set to position A. In the typical operation mode of the television camera shown in FIG. 2, a video signal is read 30 frames per second and 1000 scan lines per frame. The read time is 33 ms, and the X-ray irradiation time is 5 ms. The irradiation time may be set to, for example, about 30 ms. At the frame when an X-ray is irradiated, an image-read-out scan is stopped by the frame blanking operation of the television camera to record an X-ray image on an image pickup screen. At the next frame, the frame blanking operation is stopped and the image-read-out scan is executed to read first image data and store it in the image acquisition and processing unit. Next, the X-ray detection unit 16 is moved to position B. An average motion speed is typically about 50 cm/s, and it takes 330 ms to move the unit 16. After the unit 16 is moved to position B, second image data is acquired in the similar manner to the case of position A.

Figure 3:
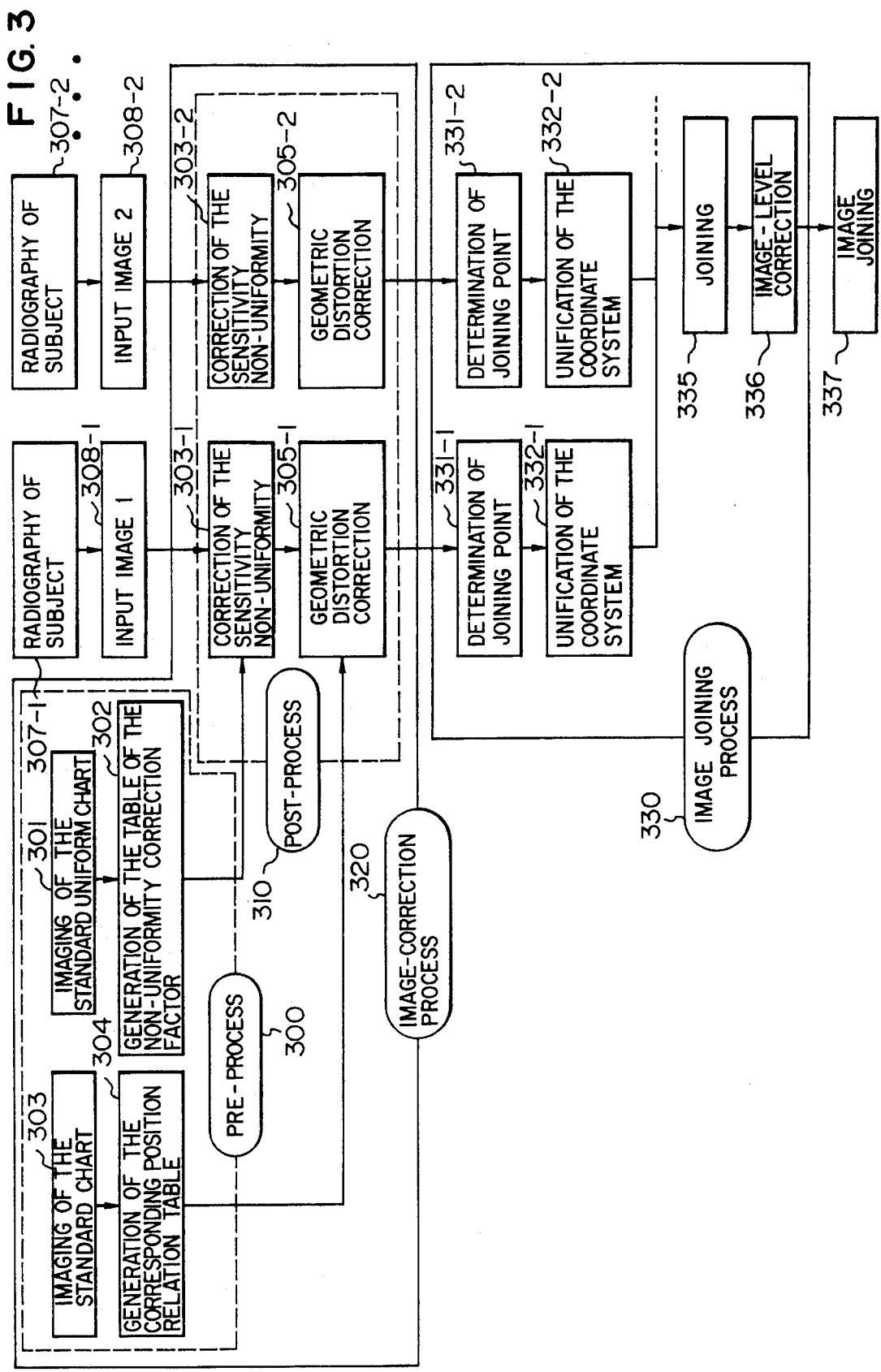
FIG. 3 is a diagram explaining an image correction and joining algorithm according to an embodiment of the present invention.

FIG. 3 illustrates an example of an image joining algorithm. This algorithm includes an image correction process for correcting the sensitivity and geometric distortion of a plurality of digital X-ray images and an image joining process for joining the plurality of digital X-ray images by aligning the common subject regions contained in the images, and for correcting the image densities.

The image correction process 320 is divided into a pre-process 300 for generating correction tables prior to X-ray imaging a chest and a post-process 310 for correcting image data. The pre-process 300 generates a non-uniformity correction factor table (302) for correcting image sensitivity non-uniformity (303-1, 303-2, ...) and a corresponding position relation table (304) for correcting image geometrical distortions (305-1, 305-2, ...). In order to generate the non-uniformity correction factor table (302), a standard chart having a uniform X-ray transmittance is imaged (301). In order to generate the corresponding position relation table (304), a standard chart having elements (such as holes) at known positions is imaged (303).

In order to generate the non-uniformity correction factor table, the standard chart with the uniform X-ray transmittance is imaged to measure an image-level (density) data of each pixel detected by the detector. The measured data itself, or the measured data with high frequency noises removed therefrom by smoothing it, is stored in the non-uniformity correction factor table. The image data $D(x, y)$ of a subject is given by the following equation (1) in the x-y coordinate system of the X-ray detector:

$$D(x, y) = \{T(x, y) + S(x, y)\} * H(x, y) * A(x, y) \quad (1)$$

where $A(x, y)$ represents an X-ray emission intensity, $T(x, y)$ represents an X-ray transmittance distribution of the subject, and $S(x, y)$ represents a scattered X-ray distribution. The image data $B(x, y)$ of the chart with a uniform X-ray transmittance is given by the following equation (2):

$$B(x, y) = k * H(x, y) * A(x, y) \quad (2)$$

where k is a constant.

For example, for the non-uniformity factor correction, the left side of the following equation (3) is calculated:

$$\ln D(x, y) - \ln B(x, y) = \ln \{T(x, y) + S(x, y)\} - \ln k \quad (3)$$

The correction result is the right side of the equation (3). In this case, the scattered X-ray distribution $S(x, y)$ is left uncorrected. As a method of correcting the scattered X-ray distribution, there is a method of substituting the scattered X-ray distribution actually measured into the equation (3). Alternatively, as will be later described, the scattered X-ray distribution may be corrected by correcting the density difference of two images as the joining point when a plurality of images are joined together.

In order to generate the corresponding position relation table, the standard chart having elements at known positions is imaged. The image of the standard chart is analyzed so that the direction and magnitude of a distortion at each element position can be known. The corresponding position relation between a subject image and the standard chart image is stored in the corresponding position relation table, using the coordinate values of each element as parameters. This table is generated using as parameters the coordinate values of all pixels of the standard chart image in the following manner.

Since pixels of a distortion-corrected image are not all in correspondence with the discrete positions of the measured standard chart image, the corresponding coordinates values are estimated from adjacent known discrete positions, by interpolation and extrapolation calculations. As the interpolation and extrapolation calculations, various interpolation methods may be used such as a nearest neighborhood method, a Lagrange interpolation method, a sampling function interpolation method, and a spline interpolation method.

Figure 4:
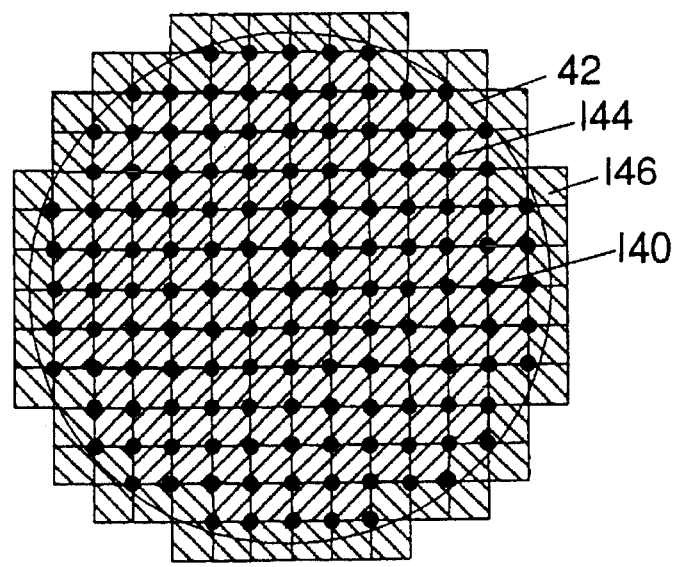
FIG. 4 is a diagram showing an example of a standard chart according to an embodiment of the present invention.

FIG. 4 shows an example of the standard chart. This standard chart has holes at a plurality of lattice points 140. In this case, the coordinate values of the lattice points are stored as parameters in the corresponding position table. Other coordinate values at positions other than the lattice points to be stored in the table are calculated by interpolation and extrapolation. In the case where the Lagrange interpolation method using four lattice points is used, as shown in FIG. 4, the coordinate values of pixels in an oblique line area 144 surrounded by four lattice points within a circle view field 42 are calculated by interpolation, and the coordinate values of pixels in another oblique line area 146 near the inside and outside of the view field 42 are calculated by extrapolation.

At the post-process (310) shown in FIG. 3, the images (308-1, 308-2, ...) obtained through radiography of a subject (307-1, 307-2, ...) undergo the sensitivity non-uniform correction process (303-1, 303-2, ...). In this correction process, the non-uniformity correction factor for each pixel of a subject image is obtained from the non-uniformity correction factor table. The pixel value of the subject is divided by the correction factor.

Next, the geometric distortion correction process (305-1, 305-2, ...) is executed. In this correction process, the coordinate value of each pixel of the distortion-corrected image is related to the corresponding coordinate value of a pixel of the measured image, by using the corresponding position relation table. The value of the pixel at the corresponding coordinate value is used as the image density. As described previously, since pixels of a distortion-corrected image are not all in correspondence with the discrete positions of the measured image, the corresponding coordinates values are estimated from adjacent known discrete positions, by interpolation and extrapolation calculations. As the interpolation and extrapolation calculations, various interpolation methods may be used such as a nearest neighborhood method, a Lagrange interpolation method, a sampling function interpolation method, and a spline interpolation method.

After the image correction process (320), an image joining process (330) is executed. At the image joining process 330, a joining point for image joining is determined (331-1, 331-2, ...) and thereafter the coordinate systems are unified so as to make the coordinate values of joining points of images coincide with each other (332-1, 332-2, ...). The images are then joined together (335), and the image level (density) of the subject image near the joining point is corrected (336). With the procedure of the algorithm illustrated in FIG. 3, it is possible to obtain a joined image 337 of a plurality of subject images while performing various corrections.

Figure 5A:
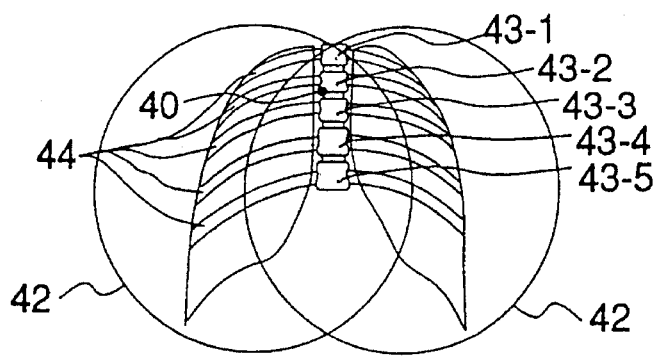
FIGS. 5A, 5B, and 5C are diagrams showing examples of joining points according to an embodiment of the present invention.
Figure 5B:
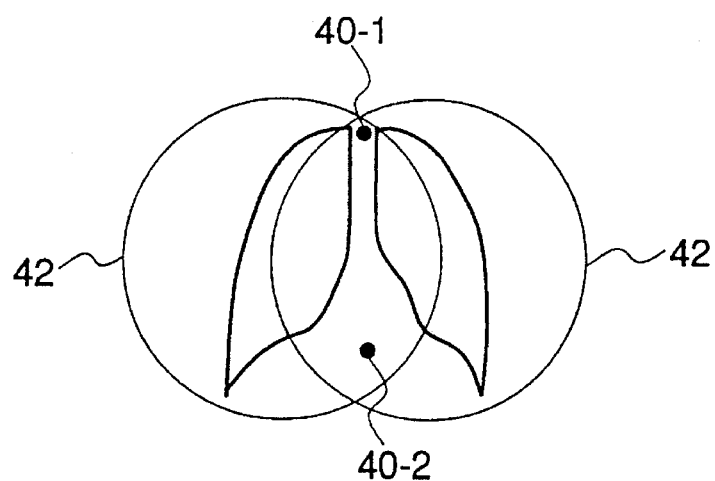

FIGS. 5A and 5B illustrate how a joining point is determined. In FIGS. 5A and 5B, there is shown the position relation between fields of view obtained by two radiographic exposures. Two circles 42 represent the fields of view of the X-ray detection unit at different imaging positions. FIG. 5A illustrates a method of using as a reference point the characteristic point (such as an edge of a particular bone) of a subject common to two X-ray images. In FIG. 5A, the first to fifth thoracic vertebrae 43-1 to 43-5 and ribs 44 are shown. One edge point on these bones, e.g., the vertebra, in this example, an edge point on the second vertebra indicated by a solid black circle, is used as a marker 40. FIG. 5B illustrates a method of using, as reference points, the points of markers (40-1, 40-2) common to two X-ray images. In this example, the markers made of circular metal pieces are attached to a subject when imaging it.

Figure 5C:
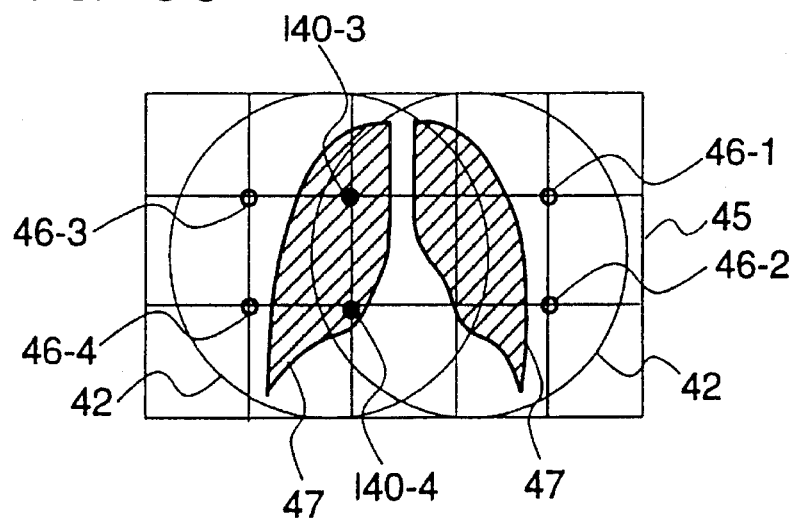

FIG. 5C illustrates a method of imaging a subject 47 by placing a marker chart 45 having a known transmittance and known positions of lattice points usable as joining points, and using as reference points some lattice points, such as points (140-3, 140-4) indicated by black solid circles. With this method, it is possible both to determine reference points and to correct geometric distortions by referring to the positions of lattice points on the subject image.

It is preferable that a reference point for determining the joining point is contained in a plurality of X-ray images. The joining method used in this case will be later described with reference to Fig. 6. Even if a reference point is contained in only one X-ray image, a plurality of X-ray images can be joined together by using known reference point coordinate values in the subject space. For example, in the case of the marker chart 45 shown in FIG. 5C, if the coordinate values of four lattice points (46-1 to 46-4) indicated by white empty circles are known, the images can be joined together.

As a method of joining a plurality of digital images, a method disclosed, for example, in JP-A-2-264372 may be used. According to this method, two points commonly imaged on a plurality of digital images are sampled, the images are joined together by using a line passing through the two points as a border line (joining line) for two images, and the average density distribution of each image is calculated to correct the density of each pixel.

Figure 6:
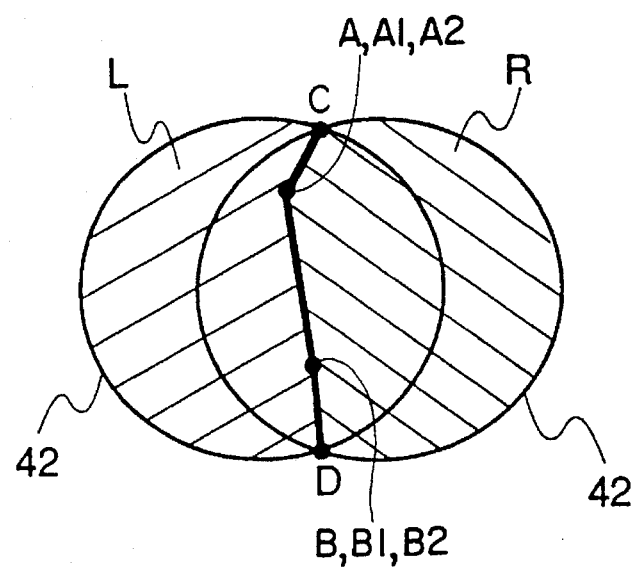
FIG. 6 is a diagram explaining an example of joining images according to an embodiment of the present invention.

FIG. 6 illustrates an example of an image joining method. In FIG. 6, two reference points A and B are commonly contained in two X-ray images R and L. If the joining points on the image L are points A1 and B1 and the joining points on the image R are points A2 and B2, points A1 and A2 and points B1 and B2 correspond to reference points A and B at the same positions of the subject.

The coordinate systems of the two images R and L are unified by making points A1 and A2 coincide with each other at point A so that points A1 and A2 are shown at the same point A in Fig. 6 and points B1 and B2 coincide with each other at point B so that points B1 and B2 are shown at the same point B in Fig. 6. Affine transformation is used for the coordinate transformation, and the corresponding position relation table obtained through interpolation and extrapolation is used. After the coordinate system transformation, two images are superposed one upon the other so as to make corresponding joining points coincide with each other. A polygonal line CABD is used as a joining line, where A is the coincident point of the joining points A1 and A2, B is the coincident point of the joining points B1 and B2, C and D are cross points of the outer peripheries of the two fields of view. The left image L to the left of the joining line and the right image R to the right of the joining line are joined together.

Generally, a polygonal line coupling coincident joining points and cross points of the outer peripheries of fields of view is used as the joining line to join images together.

Figure 7A:
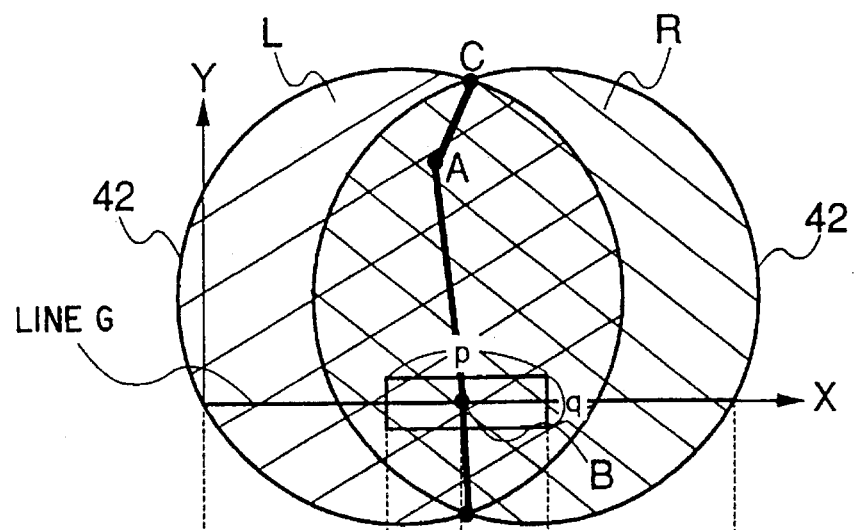
FIGS. 7A, 7B, 7C, 7D, and 7E are diagrams explaining density correction and correction factors according to an embodiment of the present invention.

After the image joining, the density (image value) of the superposed area of the images L and R is corrected in order to correct the discontinuity of the density at the joining points. FIGS. 7A to 7E illustrate an example of the density correction. The pixel value of the image L is represented by 1, and that of the image R is represented by r. In this invention, the pixel values in the area only contained in one of two images are kept unchanged, and the pixel values in the area contained on both the two images are corrected by using a density correction factor calculated by the algorithm to be described later. In FIG. 7A, R and L represent two images, and a bold polygonal line is a joining line (CABD) (refer to FIG. 6).

Figure 7B:
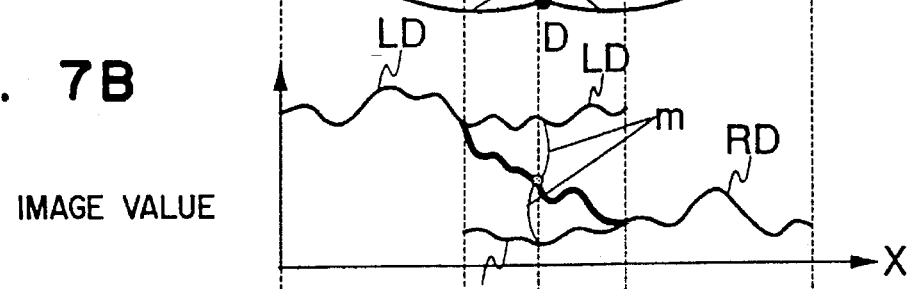
Figure 7C:
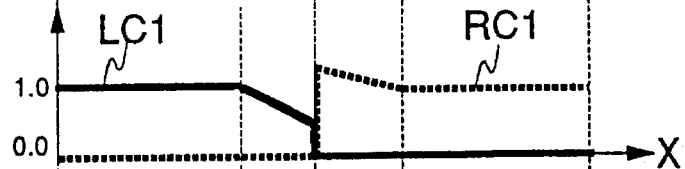

The density correction for a line G (coincident with X-axis) is illustrated in FIG. 7B. RD and LD are density curves of the images R and L on the line G. The pixel value on the joining line takes an arithmetic mean of pixel values of the images R and L on the line. The pixel values near the joining line are multiplied by correction factors, so as to make the change in the pixel values of the images R and L on the line continuous. As shown in FIG. 7C, correction factors (represented by a broken line RC1 and a solid line LC1 for the images R and L) are linearly changed so as to make the pixel values of the images R and L continuous on the joining line. The correction factors are calculated for each line (in the X-direction).

An example of determining correction factors will be described. The pixel values on the joining line are set to an arithmetic means of the pixel value (1) of the image L and the pixel value (r) of the image R. The correction amount m (refer to FIG. 7B) on the joining line is calculated from the following equation (4). The position of the line G is changed in the Y-direction to obtain an arithmetic means on a new line from the equation (4).

$$m = (L-r)/2 \ldots \quad (4)$$

Figure 7D:
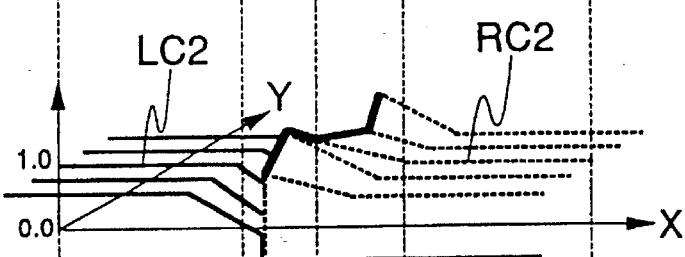

The correction amount m changes discontinuously in the vertical direction (Y-direction). Namely, as shown in FIG. 7D, correction factors (represented by a solid line LC2 and broken line RC2) calculated from the correction amount m on the joining line at each point become discontinuous in the vertical direction. As a result, if the density correction is performed by using these correction factors, the density of the corrected image becomes discontinuous in the vertical direction although it is continuous in the horizontal direction (X-direction). In order to obtain correction factors continuous also in the vertical direction, the correction amount m' on the joining line given by the following equation (5) is used:

$$m' = \sum_{j=1}^{q} \sum_{i=1}^{p} \{(l_{ij} - r_{ij})/2\}/(p*q) \quad (5)$$

where i represent the pixel position in the X-direction, and j represents the pixel position in the Y-direction.

The correction amount m' is an arithmetic mean of correction amounts m given by the equation (4) in a window defined by p pixels in the horizontal direction (X-direction) and q pixels in the vertical direction (Y-direction).

Figure 7E:
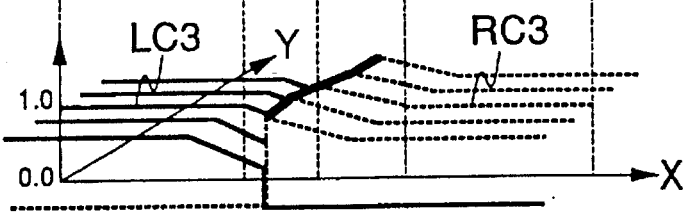

As shown in FIG. 7E, correction factors (a solid line LC3 and broken line RC3) calculated so that the correction amounts is equal to m' on the joining line m' become continuous also in the vertical direction. If the density correction is performed using these correction factors the density of the corrected image becomes continuous both in the horizontal direction (X-direction) and in the vertical direction (Y-direction) at each line.

In the above embodiment, the input field of view of the X-ray II covers one lung and mediastinum, and the whole chest can be covered by two radiographic exposures, minimizing the time required for imaging the subject and processing image data.

The shape of the view field of a joined image obtained by a chest X-ray imaging system is preferably a square or a shape like a square. The imaging time is preferably 2 seconds or less in order to minimize the motion of the chest while the breathing is stopped. In this embodiment, the input field of view of the X-ray II is a circle having a diameter of about 30 to 45 cm. The relative motion distance of the X-ray II between two radiographic exposures is about ½ of the diameter of the input field of view. The shape of a joined image is a square having a side length of about $\sqrt{3/2}$ times the diameter of the input field of view, which provides a sufficient field of view of a 35 cm square required for the chest diagnosis. The imaging time is about 0.5 sec or less, which is proper in practical use.

In the above embodiment, the position change mechanism moves the X-ray detection unit horizontally between consecutive radiographic exposures. This is suitable for imaging the chest of a subject in a standing posture, and for moving the X-ray detection unit having a large weight by using a simple structure of the mechanism.

Figure 8:
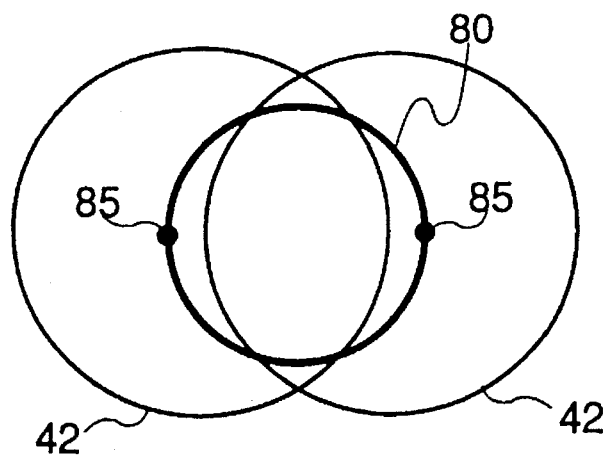
FIGS. 8 and 9 illustrate position change trajectories of X-ray detection units which change their positions according to an embodiment of the present invention.

As a trajectory of the X-ray detection unit between two radiographic exposures, a circular trajectory 80 indicated by a bold line in FIG. 8 as well as a straight trajectory may also be used. In FIG. 8, reference numerals 85 represent two imaging centers. The position change mechanism for a straight trajectory involves reversed motion directions. The position change mechanism for a circular trajectory does not require reversed motion directions so that the structure of the mechanism can be simplified.

Figure 9:
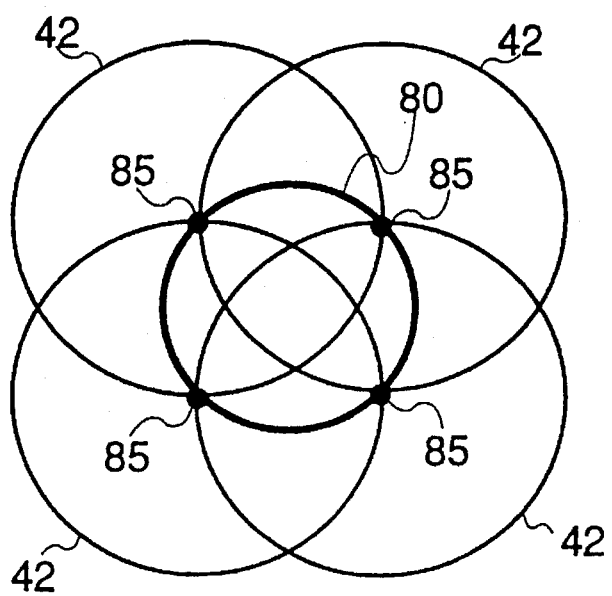

If a small X-ray II of about 12 inches is used, the number of chest radiographic exposures is preferably four. In this case, it is preferable to move the imaging center of the X-ray detection unit along the circular trajectory indicated by the bold line in FIG. 9 so that a field of view like a square can be obtained.

Figure 10:
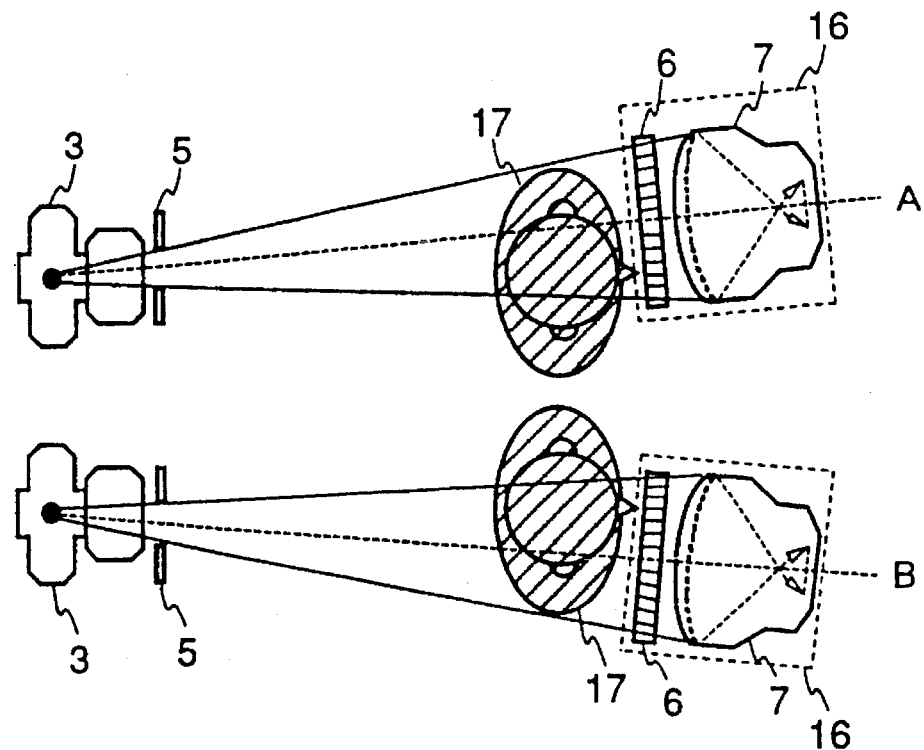
FIGS. 10 and 11 are plan views showing X-ray imaging systems according to an embodiment of the present invention.

FIG. 10 is a plan view showing the structure of an X-ray imaging system according to the second embodiment of the present invention. In the X-ray imaging system of this embodiment, the positions of an X-ray source 3 and a subject 17 are fixed. When imaging the subject 17, the X-ray source 3 positions on a center line coupling the X-ray source 3 and the center of the X-ray input plane of an X-ray detection unit 16, and the X-ray detection unit 16 moves while always maintaining its X-ray input plane perpendicular to the center line. As a result, the X-ray detection unit 16 moves along the arc line about the center of the X-ray source 3.

Instead of moving the X-ray detection unit along the arc line in the above manner, another position change mechanism may also be used wherein a linear position change system for linearly moving the center of the X-ray input plane of the X-ray detection unit 16 to predetermined imaging positions, and a rotary system for rotating the X-ray detection unit 16 placed on a stage rotating about its rotation axis and facing the unit 16 towards the X-ray source 3. In this case, the predominant motion is a linear motion so that the X-ray detection unit 16 can be moved at high speed.

In the above embodiment, the X-ray source 3 and the subject 17 are fixed. Instead, the X-ray source 3 is faced to the center of the X-ray detection unit 16 at each exposure time. In this case, the X-ray intensity distribution can be maintained constant, allowing to make the focal size small and the resolution high.

Figure 11:
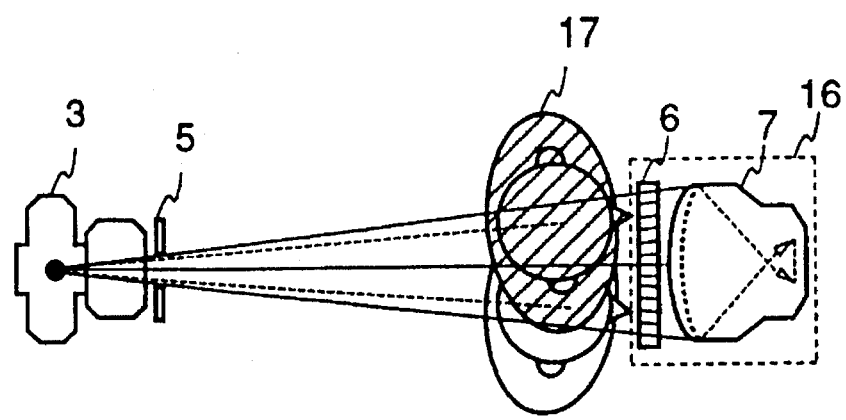
Figure 12:
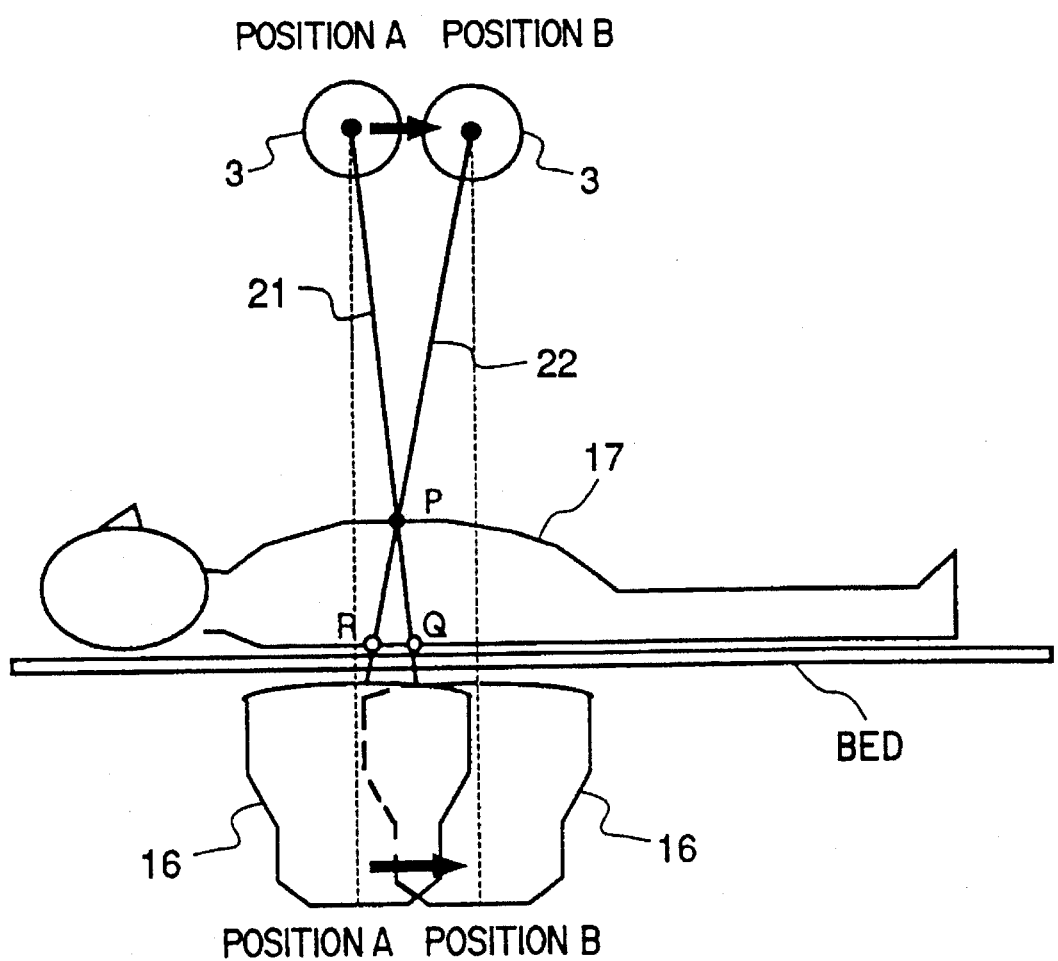
FIG. 12 is a diagram explaining the problems associated with conventional techniques.

In changing the relative position between an X-ray detection unit and a subject, the subject 17 may be moved instead of moving the X-ray detection unit 16. In this case, as shown in FIG. 11, the X-ray source 3 and X-ray detection unit 16 are fixed on a center line passing through the X-ray source and the center of the X-ray detection unit 16, while maintaining the X-ray input plane of the X-ray detection unit perpendicular to the center line. When imaging the X-ray source 3, the subject 17 is located at a predetermined position on a center line passing through the X-ray source and the center of the subject 17, while the subject 17 maintaining its posture perpendicular to the center line. The method of moving only the subject does not give any direct vibration to the X-ray detection unit, eliminating the adverse effect of vibration noises.

In addition to the above methods of imaging a plurality of divided target imaging regions by changing the relative position between the X-ray detection unit and subject, both the X-ray detection unit and subject may be moved at the same time or time sequentially.

The method of moving both the X-ray detection unit and subject provides an advantage of shortening the time required for moving them. If the relative position between the X-ray detection unit and subject is changed even during X-ray exposure, the position change mechanism can be simplified.

In a ultra high precision camera using an image pickup tube, the resolution in the horizontal scanning line direction is generally lower than that in the vertical direction. Therefore, if an X-ray absorption plate constituting the X-ray grid is vertical to the horizontal scanning line direction of the image pickup tube, an image of the X-ray absorption plate, i.e., a grid pattern, becomes unsharp on the subject image, so that the visual diagnosis of the subject image will not be obstructed.

In the above embodiments, an X-ray II-TV system using an X-ray II and a television camera of an image pickup tube has been used as the X-ray detection unit. This system has the most advanced technical development and is now widely used as the real time X-ray imaging system. A ultra high precision camera with 2100 or 4200 scanning lines may be used with this system, allowing a high resolution X-ray image to be imaged relatively easily.

Also with this system, X-ray fluoroscopy is possible, realizing easy imaging position alignment. Since an image can be read in real time, the next imaging can be started immediately after the X-ray detection unit 16 is moved to the next imaging position, and also the continuous imaging can be performed.

If the horizontal scanning line direction of an image pickup tube used as the image pickup element of a television camera is made parallel to the motion of the X-ray detection unit taking a plurality of subject images, then the position alignment of a plurality of subject images can be achieved only by parallel position changes between a plurality of subject images. Therefore, calculation for generating a joined image can be simplified, and the time required for obtaining the joined image from a plurality of subject images can be shortened.

Instead of the image pickup tube, a CCD image pickup device maybe used for a television camera, in which the direction of arrays of CCD elements is made parallel to the direction of moving the X-ray detection unit taking a plurality of subject images. If a camera using an image pickup tube is mechanically vibrated during read-out scanning, noises may be generated by the characteristic oscillation of the electrodes of the image pickup tube, resulting in a possible error. After the mechanical vibration is removed, it takes a certain time thereafter to attenuate noises. In the case of a CCD element which is a solid element, the noises are rarely generated by mechanical vibration. It is therefore possible to perform reading an image and moving the X-ray detection unit at the same time after X-ray exposure, and to perform next imaging immediately after moving the X-ray detection unit. As a result, a plurality of X-ray images used for forming a joined image can be obtained at high speed, reducing the influence of a motion of a subject during the period while the X-ray detection unit is moved.

Not only a combination of an X-ray II and a television camera but also a combination of a phosphor plate and a television camera may be used as the X-ray detection unit. In the latter case, the geometrical distortion and non-uniformity of sensitivity at low spatial frequencies of an image on the phosphor plate are smaller than an X-ray II, allowing images to be corrected and joined more easily. However, the sensitivity of a high resolution phosphor plate is lower than an X-ray II, so that used as a television camera is a high sensitivity imaging device such as a ultra high sensitivity image pickup tube using avalanche phenomenon or a ultra low noise imaging device such as a cooled CCD device.

The application fields of the present invention are not limited to chest radiography, but are applicable to other large internal organs such as the colon of a subject with a large body structure. An angiogram of a whole body may be formed by smoothly coupling joining regions of a plurality of images, for the proper diagnosis of blood vessels near the joining regions.

The digital X-ray imaging system of this invention can use various imaging methods available to conventional X-ray imaging systems, extending the application fields of the present invention. For example, an image of a wider field of view and more precise than a conventional system can be obtained by using a tomography imaging method, an enlarged imaging methods or a stereo imaging method.

What is claimed is:

1. A digital X-ray imaging system comprising:

X-ray generator means including an X-ray tube;

X-ray generator controlling means for controlling said X-ray generator means;

X-ray detecting means for detecting an X-ray transmitted through a subject, said X-ray detecting means having an X-ray grid for shielding a scattered X-ray;

signal processing means for acquiring signals from said X-ray detecting means and processing the signals to obtain a digital X-ray images of said X-ray transmitted subject through said subject;

display means for displaying an image of said subject obtained by said signal processing means;

position changing means for changing a relative position between said X-ray detecting means, said subject and said X-ray tube by moving one of said X-ray detecting means and said X-ray tube;

position change controlling means for controlling said position changing means; and imaging-sequence controlling means for controlling said position change controlling means and said X-ray generator controlling means;

wherein said imaging-sequence controlling means controls to set a plurality of imaging view fields, to set each of a plurality of regions of interest of said subject to generally a central area of an X-ray detecting plane of said X-ray generating means, said X-ray detecting plane being an incident plane of said transmitted X-ray through said subject, and to set at least one imaging view field to contain an intermediate region between said plurality of regions of interest, and said signal processing means corrects a sensitivity non-uniformity, caused by said X-ray generator means and said X-ray detecting means, of each of said digital X-ray images of said plurality of imaging view fields, and joins together a plurality of said digital X-ray images of said plurality of imaging view fields.

2. A digital X-ray imaging system according to claim 1, wherein said display means displays at least a digital X-ray image obtained by joining together at least two of said digital X-ray images of said imaging view fields.

3. A digital X-ray imaging system according to claim 1, wherein said regions of interest are the right and left lungs of said subject, generally near the center of each lung is set to the central area of the said X-ray detecting plane, and said subject is imaged two times.

4. A digital X-ray imaging system according to claim 1, wherein said signal processing means further corrects geometric distortion, caused by said X-ray generator means and said X-ray detecting means, of each of said digital X-ray images of said plurality of imaging view fields.

5. A digital X-ray imaging system according to claim 1, wherein the X-ray detecting plane of said X-ray detecting means moves on a straight trajectory in a plane containing said X-ray detecting plane, while imaging said plurality of imaging view fields.

6. A digital X-ray imaging system according to claim 1, wherein the X-ray detecting plane of said X-ray detecting means moves on a circular trajectory in a plane containing said X-ray detecting plane, while imaging said plurality of imaging view fields.

7. A digital X-ray imaging system according to claim 1, wherein said X-ray generator means and said subject are disposed at predetermined positions, and said position changing means moves said X-ray detecting means while maintaining constant the distance between said X-ray generator means and said subject and the distance between said X-ray generator means and the center of the X-ray detecting plane of said X-ray detecting means, and while setting the X-ray detecting plane perpendicular to a line passing through the center of the X-ray detecting plane and an X-ray emitting position of said X-ray generator means.

8. A digital X-ray imaging system according to claim 7, wherein said position changing means further includes rotating means for rotating said X-ray detecting means placed on a stage having a rotation axis.

9. A digital X-ray imaging system according to claim 7, wherein said position changing means further includes rotating means for rotating said X-ray detecting means placed on a stage having a rotation axis, and parallel position changing means for parallel by moving said X-ray detecting means.

10. A digital X-ray imaging system according to claim 1, wherein said position changing means moves said subject while imaging said plurality of imaging view fields.

11. A digital X-ray imaging system according to claim 1, wherein said position changing means continuously changes the relative position between said X-ray detecting means and said subject during the X-ray exposure for imaging said subject.

12. A digital X-ray imaging system according to claim 1, wherein an area providing a grid function of said X-ray grid has an area covering the X-ray detecting plane of said X-ray detecting means, and a longitudinal direction of an X-ray absorbing plate constituting said X-ray grid is perpendicular to a scanning line direction of an image pickup tube of an imaging device of a television camera constituting said X-ray detecting means.

13. A digital X-ray imaging system according to claim 1, wherein said position changing means moves said X-ray detecting means in a direction defining a straight trajectory, and said X-ray tube has an X-ray slit, and an opening of said X-ray slit moves in the direction same as the direction of movement of said X-ray detecting means.

14. A digital X-ray imaging system according to claim 1, wherein said X-ray tube has an X-ray slit, and in imaging each of said plurality of imaging view fields, said position changing means moves said X-ray tube and said X-ray slit by making the directions of said X-ray tube and said X-ray slit toward said X-ray detecting means coincide with each other.

15. A digital X-ray imaging system according to claim 1, wherein said X-ray detecting means includes an X-ray image intensifier, a television camera, and an optical system coupling said X-ray image intensifier and said television camera.

16. A digital X-ray imaging system according to claim 15, wherein said position changing means moves said X-ray detecting means in a direction defining a straight trajectory, and an image pickup tube is used as an imaging device of said television camera, and a scanning line direction of said image pickup tube is parallel to the direction of movement of said X-ray detecting means.

17. A digital X-ray imaging system according to claim 15, wherein said position changing means moves said X-ray detecting means in a direction defining a straight trajectory, and a CCD device is used as an imaging device element of said television camera, and the pixel disposal of said CCD device is parallel to the direction of moving said X-ray detecting means.

18. A digital X-ray imaging system according to claim 1, wherein the imaging view field of an X-ray image intensifier constituting said X-ray detecting means has a size covering one lung and mediastinum of said subject, and a joined image containing both the lungs and mediastinum of said subject is formed by two radiographic exposures of the right lung and mediastinum and the left lung and mediastinum.

19. A digital X-ray imaging system according to claim 18, wherein said position changing means moves said X-ray detecting means in a direction defining a straight trajectory, and the X-ray incident plane of said X-ray image intensifier has a shape of a circle, a distance of movement of said X-ray detecting means required for said two radiographic exposures is about ½ of the diameter of said circle, and said joined image has a view field of a square having the side length of about $\sqrt{3/2}$ the diameter of said circle.

20. A digital X-ray imaging system according to claim 1, wherein said signal processing means executes a pre-process for generating a sensitivity non-uniformity correction factor table used for correcting sensitivity non-uniformity caused by said X-ray generator means and said x-ray detecting means and a corresponding position relation table used for correcting geometric distortion caused by said X-ray generator means and said X-ray detecting means, prior to imaging said subject, and executes a post-process for correcting digital X-ray image data of said subject obtained by imaging the view field of said subject, wherein data of a plurality of digital X-ray images obtained by imaging a plurality of imaging view fields being subjected to the sensitivity non-uniformity correction and geometric distortion correction to join together said plurality of digital X-ray images.

21. A digital X-ray imaging system according to claim 20, wherein said sensitivity non-uniformity correction factor table is generated from digital X-ray image data obtained by imaging a chart having a uniform X-ray transmittance in one direction, and said corresponding position relation table is generated from digital X-ray image data obtained by imaging a chart having a plurality of elements with known position relations.

22. A digital X-ray imaging system according to claim 20, wherein said sensitivity non-uniformity correction factor table is generated from digital X-ray image data obtained by imaging a chart having a uniform X-ray transmittance in one direction, and said corresponding position relation table is generated from digital X-ray image data obtained by imaging a chart having a plurality of elements with known position relations, and wherein, the sensitivity non-uniformity correction for said digital X-ray image data obtained by imaging the view field of said subject being performed by obtaining a sensitivity non-uniformity correction factor at each pixel position of said digital X-ray image from said sensitivity non-uniformity correction factor table, and the geometric distortion correction for each pixel position of said digital X-ray image being performed by using said corresponding position relation table.

23. A digital X-ray imaging system according to claim 20, wherein said sensitivity non-uniformity correction factor table is generated from digital X-ray image data obtained by imaging a chart having a uniform X-ray transmittance in one direction, and said corresponding position relation table is generated from digital X-ray image data obtained by imaging a chart having a plurality of elements with known position relations, wherein the sensitivity non-uniformity correction for said digital X-ray image data obtained by imaging the view field of said subject being performed by obtaining a sensitivity non-uniformity correction factor at each pixel position of said digital X-ray image from said sensitivity non-uniformity correction factor table, and the geometric distortion correction for each pixel position of said digital X-ray image being performed by using said corresponding position relation table, and wherein in joining together said plurality of X-ray digital images of said plurality of imaging view fields, joining points whereat said plurality of X-ray digital images are joined together are determined, coordinate systems for said plurality of digital X-ray images are unified, and an obtained joined image is subjected to the density correction near the joined area.

24. A digital X-ray imaging system according to claim 20, wherein said sensitivity non-uniformity correction factor table is generated from digital X-ray image data obtained by imaging a chart having a uniform X-ray transmittance in one direction, and said corresponding position relation table is generated from digital X-ray image data obtained by imaging a chart having a plurality of elements with known position relations, wherein a marker is added to said subject, said plurality of imaging view fields are imaged, and the sensitivity non-uniformity correction for said digital X-ray image data obtained by imaging the view field of said subject being performed by obtaining a sensitivity non-uniformity correction factor at each pixel position of said digital X-ray image from said sensitivity non-uniformity correction factor table, and the geometric distortion correction for each pixel position of said digital X-ray image being performed by using said corresponding position relation table, and wherein in joining together said plurality of X-ray digital images of the imaging view fields by referring to said marker contained in common in said plurality of X-ray digital images, joining points whereat said plurality of X-ray digital images are joined together are determined, coordinate systems for said plurality of digital X-ray images are unified, and an obtained joined image is subjected to the density correction near the joined area.

25. A digital X-ray imaging system according to claim 20, wherein said sensitivity non-uniformity correction factor table is generated from digital X-ray image data obtained by imaging a chart having a uniform X-ray transmittance in one direction, and said corresponding position relation table is generated by imaging said subject with a marker chart placed on said subject, said marker chart having a plurality of elements with predetermined transmittances and position relations, and by measuring said geometric distortions of the obtained digital X-ray image from the position relations between predetermined elements of said marker chart, wherein the sensitivity non-uniformity correction for said digital X-ray image data obtained by imaging the view field of said subject being performed by obtaining a sensitivity non-uniformity correction factor at each pixel position of said digital X-ray image from said sensitivity non-uniformity correction factor table, and the geometric distortion correction for each pixel position of said digital X-ray image being performed by using said corresponding position relation table, and wherein in joining together said plurality of X-ray digital images of the imaging view fields, joining points whereat said plurality of X-ray digital images are joined together are determined, coordinate systems for said plurality of digital X-ray images are unified, and an obtained joined image is subjected to the density correction near the joined area.

26. An X-ray imaging method of radiating an X-ray from X-ray generator means to a subject, passing an X-ray transmitted through said subject through an X-ray grid for shielding a scattered X-ray, detecting said X-ray passed through said X-ray grid by X-ray detecting means, acquiring a signal detected by said X-ray detecting means and processing a digital signal representing said X-ray transmitted through said subject, and obtaining a digital X-ray image, comprising the steps of:

controlling to set a plurality of imaging view fields of said subject in order to divisionally image target imaging regions of said subject a plurality of times;

changing a relative position between said X-ray detecting means and said subject;

controlling to set each of said plurality of imaging view fields by setting each of regions of interest of said subject to generally a central area of an X-ray detecting plane of said X-ray detecting means, said X-ray detecting plane being an incident plane of said transmitted X-ray, and by setting at least one imaging view field to contain an intermediate region between said plurality of regions of interest;

correcting the sensitivity non-uniformity and geometric distortion, caused by said X-ray generator means and said X-ray detecting means, of each of said digital X-ray images of said plurality of imaging view fields;

obtaining a digital X-ray image by joining together at least two of said digital X-ray images of said plurality of imaging view fields; and displaying at least said joined digital X-ray image.

27. A digital X-ray imaging system comprising:

X-ray generator means;

X-ray generator controlling means for controlling said X-ray generator means;

X-ray detecting means for detecting an X-ray transmitted through a subject, said X-ray detecting means having an X-ray grid for shielding a scattered X-ray;

signal processing means for acquiring an output signal from said X-ray detecting means and processing the signal to obtain a digital X-ray image of said X-ray transmitted through said subject;

display means for displaying an image of said subject obtained by said signal processing means;

position changing means for changing a relative position between said X-ray detecting means and said subject;

position change controlling means for controlling said position changing means; and imaging-sequence controlling means for controlling same position change controlling means and said X-ray generator controlling means, wherein said imaging-sequence controlling means controls to set a plurality of imaging view fields, to set each of a plurality of regions of interest of said subject to generally a central area of an X-ray detecting plane of said X-ray detecting means, said X-ray detecting plane being an incident plane of said transmitted X-ray, and to set at least one imaging view field to contain an intermediate region between said plurality of regions of interest, said signal processing means corrects the sensitivity non-uniformity and geometric distortion, caused by said X-ray generator means and said X-ray detecting means, of each of said digital X-ray images of said plurality of imaging view fields, and joins together at least two said digital X-ray images of said plurality of imaging view fields, and said display means displays at least said joined digital X-ray image.

28. A digital X-ray imaging system comprising:

X-ray generator means;

X-ray generator controlling means for controlling said X-ray generator means;

X-ray detecting means for detecting an X-ray transmitted through a subject, said X-ray detecting means having an X-ray grid for shielding a scattered X-ray;

signal processing means for acquiring an output signal from said X-ray detecting means and processing the signal to obtain a digital X-ray image of said X-ray transmitted through said subject;

display means for displaying an image of said subject obtained by said signal processing means;

position changing means for changing a relative position between said X-ray detecting means and said subject;

position change controlling means for controlling said position changing means; and imaging-sequence controlling means for controlling same position change controlling means and said X-ray generator controlling means, wherein said imaging-sequence controlling means controls to set a plurality of imaging view fields, to set each of a plurality of regions of interest of said subject to generally a central area of an X-ray detecting plane of said X-ray detecting means, said X-ray detecting plane being an incident plane of said transmitted X-ray, and to set at least one imaging view field to contain an intermediate region between said plurality of regions of interest, said position changing means moves said X-ray detecting means while maintaining constant the distance between said X-ray generator means and said subject and the distance between said X-ray generator means and the center of the X-ray detecting plane of said X-ray detecting means, and while setting the X-ray detecting plane perpendicular to a line passing through the center of the X-ray detecting plane and an X-ray emitting position of said X-ray generator means, said signal processing means corrects the sensitivity non-uniformity and geometric distortion, caused by said X-ray generator means and said X-ray detecting means, of each of said digital X-ray images of said plurality of imaging view fields, and joins together at least two said digital X-ray images of said plurality of imaging view fields, and said display means displays at least said joined digital X-ray image.

29. An X-ray imaging method of radiating an X-ray from X-ray generator means including an X-ray tube to a subject, passing an X-ray transmitted through said subject through an X-ray grid for shielding a scattered X-ray, detecting said X-ray passed through said X-ray grid by X-ray detecting means, acquiring a signal detected by said X-ray detecting means and processing a digital signal representing said X-ray transmitted through said subject, and obtaining a digital X-ray image, comprising the steps of:

controlling to set a plurality of imaging view fields of said subject in order to divisionally image target imaging regions of said subject a plurality of times;

changing a relative position between said X-ray detecting means and said subject by moving one of said X-ray detecting means and said X-ray tube;

controlling to set each of said plurality of imaging view fields by setting each of regions of interest of said subject to generally a central area of an X-ray detecting plane of said X-ray detecting means, said X-ray detecting plane being an incident plane of said transmitted X-ray, and by setting at least one imaging view field to contain an intermediate region between said plurality of region of interest;

correcting a sensitivity non-uniformity and geometric distortion of said plurality of digital X-ray images caused by said X-ray generator means and said X-ray detecting means;

obtaining a digital X-ray image by joining together at least two of said digital X-ray images of said plurality of imaging view fields; and displaying at least said joined digital X-ray image.

30. A digital X-ray imaging method according to claim 29, wherein said step of changing the relative position includes moving said X-ray detecting means which includes a step of moving said X-ray detecting plane of said X-ray detecting means on a straight trajectory in a plane containing said X-ray detecting plane, while imaging said plurality of imaging view fields.

31. A digital X-ray imaging method according to claim 29, wherein said step of moving said X-ray detecting means includes a step of moving said X-ray detecting plane of said X-ray detecting means on a circular trajectory in a plane containing said X-ray detecting plane, while imaging said plurality of imaging view fields.

32. A digital X-ray imaging method according to claim 29, wherein said step of changing the relative position includes moving said X-ray detecting means which includes a step of moving said X-ray detecting means while maintaining constant the distance between said X-ray generator means and said subject and the distance between said X-ray generator means and the center of the X-ray detecting plane of said X-ray detecting means, and while setting the X-ray detecting plane perpendicular to a line passing through the center of the X-ray detecting plane and an X-ray emitting position of said X-ray generator means.

33. A digital X-ray imaging method according to claim 32, wherein said step of moving said X-ray detecting means includes a step of rotating said X-ray detecting means placed on a stage having a rotation axis.

34. A digital X-ray imaging method according to claim 32, wherein said step of moving said X-ray detecting means includes a step of moving said X-ray detecting means placed on a stage having a rotation axis, and a step of parallel moving said X-ray detecting means.

35. A digital X-ray imaging method according to claim 29, further comprising:

a pre-process step of generating a sensitivity non-uniformity correction factor table used for correcting sensitivity non-uniformity caused by said X-ray generator means and said X-ray detecting means and a corresponding position relation table used for correcting geometric distortion caused by said X-ray generator means and said X-ray detecting means, prior to imaging said subject;

a post-process step of correcting digital X-ray image data of said subject obtained by imaging the view field of said subject; and a step of subjecting data of a plurality of digital X-ray images obtained by imaging a plurality of imaging view fields to the sensitivity non-uniformity correction and geometric distortion correction.

36. A digital X-ray imaging method according to claim 35, further comprising the steps of:

generating said sensitivity non-uniformity correction factor table from digital X-ray image data obtained by imaging a chart having a uniform X-ray transmittance in one direction; and generating said corresponding position relation table from said digital X-ray image data obtained by imaging a chart having a plurality of elements with known position relations.

37. A digital X-ray imaging method according to claim 35, further comprising the steps of:

generating said sensitivity non-uniformity correction factor table from digital X-ray image data obtained by imaging a chart having a uniform X-ray transmittance in one direction;

generating said corresponding position relation table from digital X-ray image data obtained by imaging a chart having a plurality of elements with known position relations;

performing the sensitivity non-uniformity correction for said digital X-ray image data obtained by imaging the view field of said subject by obtaining a sensitivity non-uniformity correction factor at each pixel position of said digital X-ray image from said sensitivity non-uniformity correction factor table; and performing the geometric distortion correction for each pixel position of said digital X-ray image data by using said corresponding position relation table.

38. A digital X-ray imaging method according to claim 35, further comprising the steps of:

generating said sensitivity non-uniformity correction factor table from digital X-ray image data obtained by imaging a chart having a uniform X-ray transmittance in one direction;

generating said corresponding position relation table from digital X-ray image data obtained by imaging a chart having a plurality of elements with known position relations;

performing the sensitivity non-uniformity correction for said digital X-ray image data obtained by imaging the view field of said subject by obtaining a sensitivity non-uniformity correction factor at each pixel position of said digital X-ray image from said sensitivity non-uniformity correction factor table;

performing the geometric distortion correction for each pixel position of said digital X-ray image data by using said corresponding position relation table; and in joining together said plurality of X-ray digital images of said plurality of imaging view fields, determining joining points whereat said plurality of X-ray digital images are joined together, unifying coordinate systems for said plurality of digital X-ray images, and subjecting an obtained joined image to the density correction near the joined area.

39. A digital X-ray imaging method according to claim 35, further comprising the steps of:

generating said sensitivity non-uniformity correction factor table from digital X-ray image data obtained by imaging a chart having a uniform X-ray transmittance in one direction;

generating said corresponding position relation table from digital X-ray image data obtained by imaging a chart having a plurality of elements with known position relations;

adding a marker to said subject and imaging said plurality of imaging view fields;

performing the sensitivity non-uniformity correction for said digital X-ray image data obtained by imaging the view field of said subject by obtaining a sensitivity non-uniformity correction factor at each pixel position of said digital X-ray image from said sensitivity non-uniformity correction factor table;

performing the geometric distortion correction for each pixel position of said digital X-ray image data by using said corresponding position relation table; and in joining together said plurality of X-ray digital images of the imaging view fields by referring to said marker contained in common in said plurality of X-ray digital images, determining joining points whereat said plurality of X-ray digital images are joined together, unifying coordinate systems for said plurality of digital X-ray images, and subjecting an obtained joined image to the density correction near the joined area.

40. A digital X-ray imaging method according to claim 35, further comprising the steps of:

generating said sensitivity non-uniformity correction factor table from digital X-ray image data obtained by imaging a chart having a uniform X-ray transmittance in one direction;

generating said corresponding position relation table by imaging said subject with a marker chart placed on said subject, said marker chart having a plurality of elements with predetermined transmittances and position relations, and by measuring said geometric distortions of the obtained digital X-ray image from the position relations between predetermined elements of said marker chart;

performing the sensitivity non-uniformity correction for said digital X-ray image data obtained by imaging the view field of said subject by obtaining a sensitivity non-uniformity correction factor at each pixel position of said digital X-ray image from said sensitivity non-uniformity correction factor table;

performing the geometric distortion correction for each pixel position of said digital X-ray image data by using said corresponding position relation table; and in joining together said plurality of X-ray digital images of the imaging view fields, determining joining points whereat said plurality of X-ray digital images are joined, unifying coordinate systems for said plurality of digital X-ray images, and subjecting an obtained joined image to the density correction near the joined area.

41. A digital X-ray imaging system comprising:

X-ray generator means including an X-ray tube;

X-ray generator controlling means for controlling said X-ray generator means;

X-ray detecting means for detecting an X-ray transmitted through a subject, said X-ray detecting means having an X-ray grid for shielding a scattered X-ray;

signal processing means for acquiring signals from said X-ray detecting means and processing the signals to obtain digital X-ray images of said X-ray transmitted subject through said subject;

display means for displaying an image of said subject obtained by said signal processing means;

position changing means for changing a relative position between said X-ray detecting means and said subject and a relative position between said X-ray detecting means and said X-ray generator means by moving said X-ray detecting means;

position change controlling means for controlling said position changing means; and imaging-sequence controlling means for controlling said position change controlling means and said X-ray generator controlling means;

wherein said imaging-sequence controlling means controls to set a plurality of imaging view fields, to set each of a plurality of regions of interest of said subject to generally a central area of an X-ray detecting plane of said X-ray generating means, said X-ray detecting plane being an incident plane of said transmitted X-ray through said subject, and to set at least one imaging view field to contain an intermediate region between said plurality of regions of interest.

42. A digital X-ray imaging system according to claim 41, wherein said signal processing means corrects a sensitivity non-uniformity and geometric distortion, caused by said X-ray generator means and said X-ray detecting means, of each of said digital X-ray images of said plurality of imaging view fields, and joins together a plurality of said digital X-ray images of said plurality of imaging view fields.

43. A digital X-ray imaging system according to claim 41, wherein the X-ray detecting plane of said X-ray detecting means moves on a circular trajectory in a plane containing said X-ray detecting plane, while imaging said plurality of imaging view fields.

44. A digital X-ray imaging system according to claim 41, wherein said X-ray generator means and said subject are disposed at predetermined positions, and said position changing means moves said X-ray detecting means while maintaining constant the distance between said X-ray generator means and said subject and the distance between said X-ray generator means and the center of the X-ray detecting plane of said X-ray detecting means, and while setting the X-ray detecting plane perpendicular to a line passing through the center of the X-ray detecting plane and an X-ray emitting position of said X-ray generator means.

45. A digital X-ray imaging system according to claim 44, wherein said position changing means further includes rotating means for rotating said X-ray detecting means placed on a stage having a rotation axis.

46. A digital X-ray imaging system according to claim 44, wherein said position changing means further includes rotating means for rotating said X-ray detecting means placed on a stage having a rotation axis, and parallel position changing means for parallelly moving said X-ray detecting means.

47. An X-ray imaging method of radiating an X-ray from X-ray generator means to a subject, passing an X-ray transmitted through said subject through an X-ray grid for shielding a scattered X-ray, detecting said X-ray passed through said X-ray grid by X-ray detecting means, acquiring a signal detected by said X-ray detecting means and processing a digital signal representing said X-ray transmitted through said subject, and obtaining a digital X-ray image, comprising the steps of:

moving said X-ray detecting means to set an imaging view field by changing a relative position between said X-ray detecting means and said subject, while maintaining constant the distance between said X-ray generator means and said subject and the distance between said X-ray generator means and the center of the X-ray detecting plane of said X-ray detecting means, and while setting the X-ray detecting plane perpendicular to a line passing through the center of the X-ray detecting plane and an X-ray emitting position of said X-ray generator means;

controlling to set each of said plurality of imaging view fields by setting each of regions of interest of said subject to generally a central area of an X-ray detecting plane of said X-ray detecting means, said X-ray detecting plane being an incident plane of said transmitted X-ray, and by setting at least one imaging view field to contain an intermediate region between said plurality of regions of interest;

correcting the sensitivity non-uniformity and geometric distortion, caused by said X-ray generator means and said X-ray detecting means, of each of said digital X-ray images of said plurality of imaging view fields;

obtaining a digital X-ray image by joining together at least two of said digital X-ray images of said plurality of imaging view fields; and displaying at least said joined digital X-ray image.

* * * * *